UNITED STATES PATENT OFFICE.

EDWARD O. BENJAMIN, OF NEWARK, NEW JERSEY.

RUBBER GASKET, PACKING, ETC.

1,409,277. Specification of Letters Patent. Patented Mar. 14, 1922.

No Drawing. Application filed July 1, 1918, Serial No. 242,973. Renewed July 28, 1921. Serial No. 488,153.

*To all whom it may concern:*

Be it known that I, EDWARD O. BENJAMIN, a citizen of the United States, and resident of Newark, in the county of Essex and State of New Jersey, have invented certain new and useful Improvements in Rubber Gaskets, Packing, Etc., of which the following is a specification.

My invention relates to devices of the above type which contain rubber and which have those qualities of rubber which are desirable for such purposes without having those which are undesirable. It concerns more particularly the physical, chemical and electrical qualities of the article, these being more or less independent of whether the article is molded, pressed or rolled in final form, or in sheets or masses from which the article may be subsequently shaped.

While my specific purpose has been to produce gaskets especially suited for use in electrolytic cells of the type shown in my application Serial No. 183,828, filed August 1st, 1917, the invention may be embodied in many other forms and may be used for any purpose where any of the special qualities of the material may be found necessary or desirable.

My success in attaining this specific purpose is one of the specific results from my discovery of how to effect various chemical combinations of rubber or its equivalent with phenol-formaldehyde condensation products or their equivalents, in the presence of and probably in combination with small percentages of sulphur or its equivalent, and also from my discovery of how to do this in such manner as to successfully incorporate, physically hold together, and chemically protect considerable quantities of filler.

According to present practice, the hardening of rubber for such purposes is more usually accomplished by partial vulcanizing, usually by the addition of sulphur or other polymerizing agent, and the application of heat, the degree of hardening and other physical qualities of the product being dependent within limits upon the amount of sulphur employed and the degree and duration of the heat applied.

As explained in my companion applications, the difficulty with ordinary vulcanizing is that the rubber product is never really stable until vulcanization has been carried to its limit, as for instance, in the production of what is known as "hard rubber" or "ebonite". Products in any of the intermediate stages or degrees of vulcanization have an affinity for a large number of very common reagents to which they are ordinarily exposed by the conditions of use. Almost without exception, these reagents are destructive, tending to change the product either toward the brittle or frail condition when the reaction is oxidizing or dehydrating and toward the plastic or liquidified condition when the reaction is reducing or hydrogenating. In either case the elasticity and tensile strength are destroyed and the material rendered useless for most of the purposes for which it is commonly employed.

My method, broadly stated, contemplates employing sufficient vulcanizing agent to induce the active affinity stage but not sufficient to satisfy it, and simultaneously supplying to the rubber some other substance which while satisfying these undesirable affinities, will not destroy the desirable physical qualities and which may in certain cases improve certain qualities or introduce new qualities.

My discovery of the generic scope and also the limitations of my said method has involved discovering many new specific products. A great variety of these are described in one of said companion applications in which I have made broad claims covering the generic features of my new processes and products; also specific claims for the rigid products and still more specific claims for the rigid products when made of high insulating quality. A second companion application which is a division of said application contains broad claims for the softer products which I have discovered, particularly tough pliable products, and the more specific claims thereof are limited to products in which a binder constituent gives a toughness and pliability adapting the products for special purposes as for instance, leather substitutes, especially when organic fibrous fillers are employed. These novel softer products result from my discovery that they can be produced and my success in practically demonstrating what modifications must be made and what limits must be imposed in order to successfully produce them.

The novel products constituting my present inventions are included in the comprehensive disclosures of said other applications but are specifically claimed only in this application.

My present invention involves the discovery that rubber, sulphur, condensation product and filling material can be compounded in proper proportions and properly treated so as to make gaskets and packing of the proper degree of moldability and resilience for making perfectly tight joints and which will not distort, flow or break when clamping pressure is applied nor shrink, harden or crack under the conditions of long continued use.

I have also discovered that the proportion of sulphur used, and the proportion remaining uncombined in the product, may be made so small that the sulphur will not attack or be attacked by the metals with which the gasket or packing is brought in contact.

I have also discovered that the sulphur, condensation product and rubber can be associated in such proportions and under such conditions, and combined under such pressure and heat that the material will be substantially proof against potash, soda, acid and other chemical solutions such as deteriorate and destroy rubber gaskets commonly used for such purposes in various connections, as for instance, in electrolytic cells and in primary and secondardy batteries.

The rubber, condensation product and sulphur constituents are highly non-conducting and I have discovered that these can be associated with each other and with large percentages of non-conducting filling material without incorporating any substances which would destroy the insulating qualities of the product. In fact, relatively thin sheets of material produced in accordance with my present invention have successfully withstood electrical pressures above 30,000 volts.

The condensation product may be one derived by reaction of phenol or its homologues with formaldehyde or its polymers or hydrates, but I prefer the cresol-formaldehyde condensation product. The condensation product is used in one of its primary states before reaching the final infusible, insoluble state.

The inert material, the particles of which are to form the nuclei for the coating may be asbestos, mica, talc or similar material but for my insulating packing I prefer pure, short fiber asbestos. Various kinds of rubber may be employed but for my purpose, I prefer standard commercial Ceylon rubber containing less than 3% of resin. The additional filling material may be such inert substances as asbestos, mica or talc, etc. but I prefer Clina mica.

In order to produce a material having the desired qualities, I have discovered that the minimum amount of the asbestos that will provide proper nuclei for a given amount of condensation product is two parts by weight of the asbestos for one part of the condensation product, but for my present invention, I prefer that the proportion be somewhat greater than this, say about 2¼ to 2½ parts asbestos to one part condensation product.

The proportion of condensation product to rubber should not exceed 15% by weight of condensation product to 85% of rubber but I prefer that it be nearer one-half of the maximum or say 8% to 11% of condensation product for 92% to 89% of rubber.

The sulphur separately mixed with the rubber as above described should be just enough to combine with the rubber and that in any event the sulphur remaining uncombined in the finished product should not exceed 1%. To this end and for my present purpose, I prefer that the sulphur be 2 to 3% of the rubber-sulphur mixture. The sulphur may be increased considerably thereby shortening the time of heating necessary to complete the reaction and giving a somewhat harder product. Increasing sulphur much beyond 4% or 5% however, will make the material less stable and more likely to become brittle with use or lapse of time. The sulphur may also be decreased to say 1% but this greatly lengthens the time required for the heat treatment thereby increasing the expense of manufacture.

The binder product above described may be mixed with the non-conducting filler in any desired proportions, subject to the limitation that not less than 6% of the binder is desirable to properly hold and protect the filler, but for my present purpose, I prefer to use about 20% to 40% of binder, the mica used as the filler, taken with the asbestos used as nuclei, being thus approximately 60% to 80% of the total binder and filler.

The following is an illustrative example of how to make gaskets embodying all of the qualities above described as desirable for electrolytic tanks.

| | |
|---|---|
| Ceylon rubber | 22. % |
| Sulphur | .5% |
| Asbestos (for nuclei) | 5.6% |
| Cresol condensation product | 2.4% |
| Clina mica (filler) | 69.5% |

In this formula the sulphur is 2.22% of the rubber-sulphur, the condensation product is 9.84% of rubber-condensation product, the binding material including rubber and condensation product is 24.4% of the whole, and the inert materials including asbestos nuclei and mica filler are 75.1 of the total.

Certain variations, substitutions, omissions or additions of constituent materials may be made to facilitate manufacture or to adapt the product for other uses, and these may involve certain advantages or disadvantages as where conducting or partly conducting material is substituted for non-conducting filler, or there may be both advantage and disadvantage according to the view-point or purpose. For instance, a somewhat softer material of somewhat less insulating quality may be made according to the following formula.

| | |
|---|---|
| Ceylon rubber | 26. % |
| Sulphur | .5% |
| Asbestos (nuclei) | 7. % |
| Cresol condensation product | 3. % |
| Litharge | 6. % |
| China mica (filler) | 57. 5% |

In this formula the sulphur is 1.89% of the rubber-sulphur, the condensation product is 10.34% of the rubber-condensation product binder, the binding material including rubber and condensation product is 29% of the whole and the inert materials including asbestos nuclei and mica filler are 64.5% of the total.

For any of these products the steps to be followed are more or less similar. The condensation product, in one of its primary states, is first thoroughly mixed with and coated on to the nuclei, preferably short fiber asbestos and then spread out and allowed to harden without however changing it over to the final insoluble, infusible form. It is then comminuted or pulverized in any suitable way.

By a separate process the rubber and sulphur are molded together into intimate mixture, preferably by repeated folding and passing through warm rolls (preferably about 100° F.) until the sulphur becomes invisible (probably in solution) in the rubber.

The coated material in a dry state is incorporated into the rubber-sulphur mixture preferably by rolling and folding together until no layers or surfaces of separation appear and the mass is of uniform color and consistency throughout.

The material thus formed is relatively soft and moldable and the filler is added gradually while the material is being repeatedly rolled, folded and re-rolled. This process is continued until the material becomes perfectly homogeneous and of reddish brown color throughout.

The material is then cut to proper size and shape, put in the mold and subjected to hydraulic pressure of say 2000 pounds per square inch, the mold being heated preferably by steam at about 21 pounds pressure, that is to say, preferably about 260° Fahrenheit.

The heat of the mold may be varied considerably but too little heat will make the reaction slow or incomplete while too much heat too suddenly applied may make the product too hard or brittle and excessive heat may burn the rubber.

Where the condensation product is derived from commercial cresols, the reaction will begin somewhat below 260° Fahrenheit, and will be completed at temperatures somewhat higher, probably because commercial cresol is usually a mixture of ortho, meta and para-cresol but, for phenol condensation product the temperature is more definite and the reaction more sudden when that temperature is reached. For my rigid products the heat may be raised considerably beyond the critical temperature required for the reaction, that is to say to 290° or 300° F.

The closeness of grain of the product will be governed to a certain extent by the amount of the pressure exerted upon the material in the mold, the grain being closer where great pressure is used.

When the above specified heat and pressure are employed, the mold may be brought to heat in about 3 or 4 minutes and this heat and pressure continued for a sufficient time to complete the reaction. For the tough pliable products, say half an hour on the average, will be sufficient. The material expands slightly while the reaction resulting in combination of the condensation product with the rubber is taking place and the process will be complete a short time after the material has ceased to expand.

The completeness of the reaction may be determined by the change in color of the material, this being quite marked and easily recognized in practice but not so easy to describe. In general, it may be said that the raw material approximates a reddish brown while the finished product is more nearly an olive gray.

Composite products suitable for various purposes may be produced by combining different mixtures or by varying the proportions of binder or sulphur in different parts of the same article, as for instance, a layer of mixture giving a softer product may be rolled or otherwise combined with a layer of mixture giving a harder product, or the surface of an article or sheet may be treated to increase the percentage of sulphur or to apply a modified binder.

My raw mixture is reddish brown in color, but the reaction changes the substance to an olive gray color.

The reaction destroys the cresol odor characteristic of the raw mixture and renders the final product substantially odorless.

The shrinkage of the mixture during the heat treatment is entirely different both in degree and causation from those characteristic of either the rubber or the condensation product. For instance;

(a) In molding rubber, the rubber swells upon heating and overflows the mold, then, upon cooling, it contracts, the contraction in the case of pure rubber being about threequarters of an inch to the foot and in the case of filled rubber about one-quarter of an inch to the foot.

(b) The condensation product acts in the same way, overflowing on heating and shrinking on cooling, though the amount of the shrinkage is not so extraordinarily large as in the case of rubber.

(c) As contrasted with this, my mixture swells only a very little upon heating, overflows scarcely at all, then, as the vulcanizing reaction progresses, and without cooling, it shrinks only a trace. The shrinkage is progressive during the reaction and when the reaction is finished, no further shrinkage occurs upon cooling. For instance, for some large rectangular gaskets about three feet by four feet, the molds were made the exact size of the gasket. This would be entirely impossible in the case of rubber, bakelite or any other rubber-like gasket.

My gaskets are practically proof against destructive action of heat, electricity, the natural elements and is very resistant to chemicals such as alkalies, acids and the like, the action of which is far more destructive on either rubber or on the condensation product, than on my product derived from the two substances by the above described method.

These results may be and preferably are, produced by a degree and time of heat treatment wholly insufficient for changing primary condensation product into a final infusible form.

They may be and preferably are produced with the sulphur less than 3% of the rubber-sulphur mixture as against 5% to 10% of sulphur ordinarily employed as the minimum requirement for making raw rubber commercially usable.

I thus combine the advantages of chemical stability attainable by full vulcanization with sulphur as in hard rubber or ebonite, together with the physical qualities heretofore attainable only in the partially vulcanized easily deteriorating forms of rubber.

From the foregoing explanation of the chemical and physical results which I obtain, it will be evident that the term "condensation" product is employed herein merely as a convenient way of identifying a certain class of compounds having the above described peculiar chemical properties and reactions with reference to sulphur and rubber molecules in the presence of heat. Except where otherwise indicated, the expression "phenol," or "phenolic condensation product" is used in a generic sense and is intended to include phenol cresols, zylenol condensation products or their equivalents. The word "condensation" is used for such identification merely because in present commercial practice most of the compounds suitable for my purpose are obtainable by condensation through catalytic action.

While I have given illustrative examples of the inert materials, condensation product and binders which may be employed and also an illustrative formula showing constituent materials and their percentages, calculated to produce a very desirable embodiment of my invention, it will be understood by those skilled in the art that various omissions and substitutions of constituent materials, as well as various changes in the proportions may be made without departing from the spirit of my invention.

I claim:

1. A resiliently compressible tough, stable, non-conducting gasket or packing material consisting of non-conducting, wholly mineral filling material, held and protected by rubber united with phenolic condensation product in the presence of sulphur, by heat and pressure applied while the condensation product is in primary soluble state, the completed material containing less than 1% of uncombined sulphur.

2. A resiliently compressible tough, stable, non-conducting gasket or packing material consisting of non-conducting, wholly mineral filling material, held and protected by rubber united with phenolic condensation product in the presence of sulphur, by heat and pressure applied while the condensation product is in primary soluble state, said sulphur being less than 3% of the rubber-sulphur; said condensation product being less than 11% of the combined rubber-condensation product; and said rubber-condensation product being more than 20% of the whole.

3. A resiliently compressible tough, stable, non-conducting gasket or packing material consisting of non-conducting, wholly mineral filling material, held and protected by rubber united with phenolic condensation product in the presence of sulphur, by heat and pressure applied while the condensation product is in primary soluble state, and said sulphur being less than 3% and more than 1% of the rubber-sulphur; said condensation product being less than 11% and more than 8% of the rubber-condensation product; and said rubber-condensation product being less than 40% and more than 20% of the whole.

4. A resiliently compressible tough, stable, non-conducting gasket or packing material consisting of non-conducting, wholly mineral filling material, held and protected by rubber united with phenolic condensation product in the presence of sulphur, by heat and pressure applied while the condensation product is in primary soluble state, and said sulphur being less than 3% and more than 1% of the rubber-sulphur; said condensation product being less than 11% and more than 8% of the rubber-condensation product; and said rubber-condensation product being less than 40% and more than 20% of the whole, the completed material containing less than 1% of uncombined sulphur.

5. As an article of manufacture, a gasket substantially proof against deterioration by ordinary acids and alkalies, a good insulator resiliently compressible and moldable so as to form a water-tight joint where compressed between surfaces of a joint, said gasket comprising a binding material intimately mixed with a filler of finely comminuted mica, said binder consisting of finely comminuted asbestos nuclei coated with films of phenolic condensation product in the primary soluble state and intimately mixed with unvulcanized rubber containing 1% to 5% of free sulphur, said mixture being heat-treated to combine the rubber condensation product and sulphur to such an extent as to substantially satisfy the chemical affinities of the constituent materials.

Signed at New York city in the county of New York, and State of New York this 25th day of June, A. D. 1918.

EDWARD O. BENJAMIN.